United States Patent

[11] 3,556,350

| [72] | Inventor | James O. Hanley |
| | | Minnetonka, Minn. |
| [21] | Appl. No. | 807,721 |
| [22] | Filed | Mar. 17, 1969 |
| [45] | Patented | Jan. 19, 1971 |
| [73] | Assignee | Crest Industries, Inc. |
| | | Minnetonka, Minn. |
| | | a corporation of Minnesota |

[54] METHOD AND APPARATUS FOR TREATING AND SUPPLYING WATER
3 Claims, 1 Drawing Fig.

[52] U.S. Cl. .................................................. 222/176
[51] Int. Cl. ............................................. H01c 15/00
[50] Field of Search ........................................... 222/176, 64; 141/231

[56] References Cited
UNITED STATES PATENTS

| 3,194,438 | 7/1965 | Walker et al. ................ | 222/176X |
| 3,270,918 | 9/1966 | Goodrich et al. ............. | 222/176X |

*Primary Examiner*—George T. Hall
*Attorney*—Merchant & Gould

ABSTRACT: This disclosure embodies a method for "on the site" treatment of water which is designed to supply treated water to water coolers without removing the container from the cooler apparatus and this disclosure also embodies portable apparatus for treating and supplying water to water cooler containers without removal from their location of use.

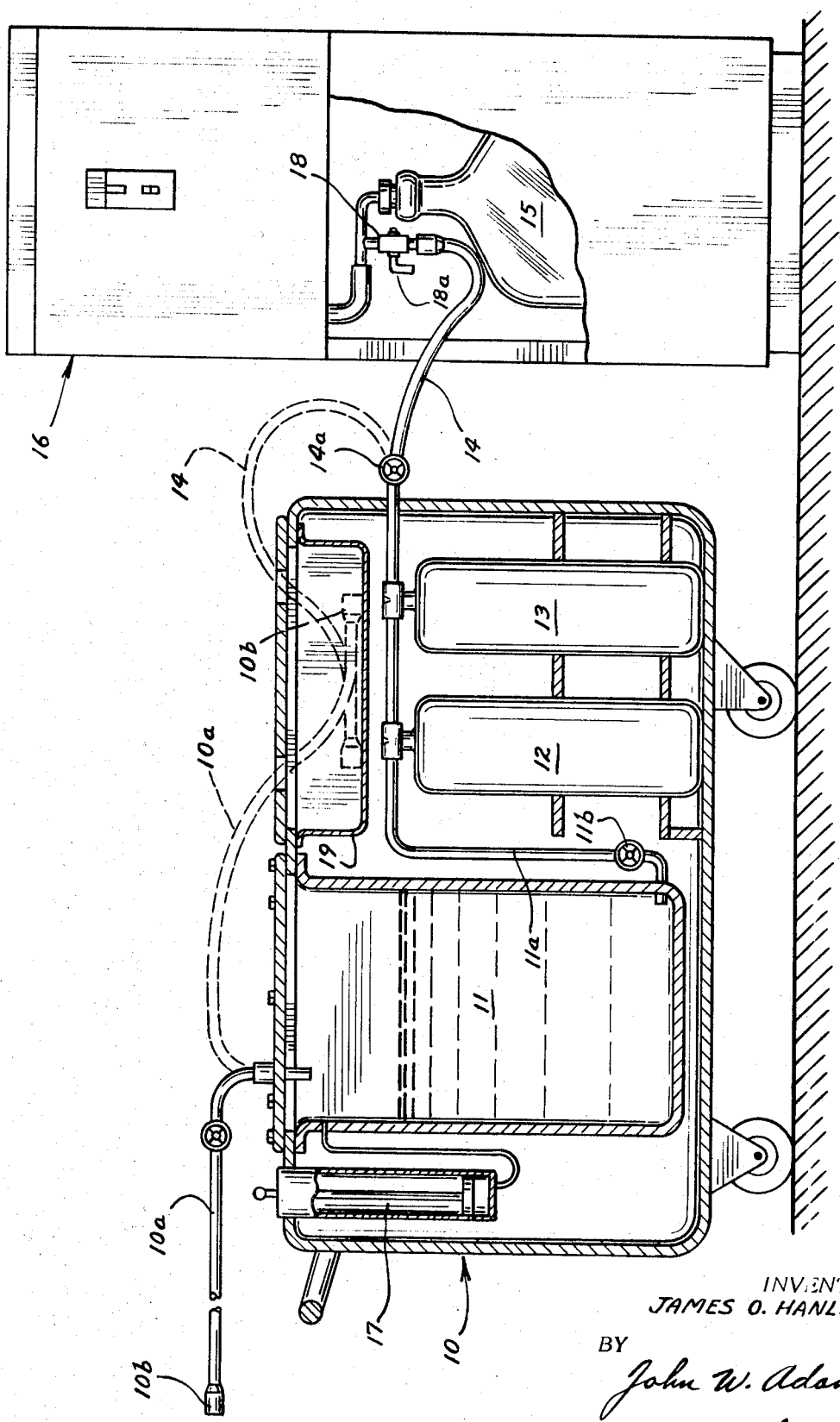

METHOD AND APPARATUS FOR TREATING AND SUPPLYING WATER

In the past containers for drinking water coolers have been exchanged at the site of use after having been filled at a bottling or filling plant. This not only requires expensive equipment at the filling plant for sterilizing, refilling and capping these containers but also requires the expense of transporting the full and empty containers back and forth from the filling plant to the location of use.

It is an object of the present invention to provide portable treating and supply apparatus which is specifically designed to be quickly and easily transported from one cooler location to another and which will eliminate the necessity for exchanging the cooler containers by permitting the same to be refilled at the site of use thus eliminating the expense and the problems previously existing.

It is another object to provide a method for treating and supplying treated water to water coolers at the location where they are in service without exchanging the supply containers of the water cooler apparatus.

These and other objects and advantages of this invention will more fully appear from the following description made in connection with the accompanying drawings in which:

FIG. 1 is a central longitudinal section through apparatus embodying this invention and showing the apparatus in position for refilling the supply container in its position of use in a water cooler.

In the apparatus disclosed a wheeled carrier 10 is provided which has a reservoir tank 11 into which untreated water can be supplied through flexible conduit 10a from any suitable water supply source such as a conventional water faucet which can be connected to conduit 10a as by a connection fitting 10b. From the reservoir tank 11 the water is supplied to one or more filter and/or treating beds such as the filter bed 12 and the treating bed 13 and a refilling conduit 14 is connected thereto refill the container or bottle 15 of a water cooler 16. Suitable means for supplying the water to the bottle 15 under pressure are provided such as the air pump 17 which supplies air to the otherwise sealed reservoir tank 11. The air pressure of course forces the water out of the reservoir 11 through the conduit 11a having a valve 11b therein and through the water treating beds 12 and 13 into the supply refill conduit 14 having a suitable discharge control valve 14a.

The container filling conduit 14 is connected to the container bottle 15 as by a T-connector 18 having a valve 18a therein. A suitable connection is made to the connector 18 such as the slip-fit connection 18b illustrated.

The ends of the conduit 14 and the reservoir filling conduit 10a are normally stored in a sanitizing pan 19 which contains any suitable nontoxic sterilizing solution to prevent contamination of the ends of the respective conduits when not in use, and a valve 10c is provided in conduit 10a.

By providing the portable reservoir and treating beds it is possible to refill water cooler containers at their use location and thus practice my new method embodying this invention which includes the steps of providing portable water treating apparatus, supplying untreated water thereto and supplying treated water at the site of use to a supply container such as the bottle 15 without contaminating the bottle or its contents and without moving it from its position of use.

It will be seen that I have provided an extremely simple yet highly efficient method and apparatus for refilling water cooler containers at their location of use thus obviating the necessity of requiring the containers to be transported back and forth from the point of use to the refilling location and also eliminating entirely the necessity for sterilizing the containers since they will not be subject to contamination by transportation back to the refilling location.

It will of course be understood that various changes may be made in the form, detail, arrangement and proportion of the parts embodying this invention without departing from the scope thereof, which generally stated is set forth in the appended claims.

I claim:

1. The method for treating and supplying treated water to water dispensing apparatus at its location of use consisting in:
   a. providing a light weight, easily transportable water treating and supply apparatus;
   b. supplying untreated water to said apparatus;
   c. causing said untreated water to pass through the desired beds of treating material; and
   d. dispensing the treated water into the container for a drinking water cooler to refill the same at the location of use thereof.

2. Portable apparatus for treating and supplying treated water to drinking water dispenser at its location of use, said apparatus comprising:
   a. a carriage having a reservoir tank;
   b. treating material for treating the water;
   c. means for supplying untreated water under pressure through said treating material; and
   d. a dispensing conduit receiving water from said treating material and having a control valve therein to facilitate refilling of the supply container at its location of use.

3. The structure set forth in claim 2 and
   a. a filling conduit delivering untreated water to said reservoir tank,
   b. at least one treating tank confining said treating material and connected to said reservoir and having said dispensing conduit connected therewith, and
   c. a sterilizing tank for receiving the respective ends of said filling conduit and said dispensing conduit to prevent contamination thereof when not in use.